United States Patent [19]

Claassen et al.

[11] 4,169,622
[45] Oct. 2, 1979

[54] TONG FOR SUPPORTING GLASS SHEETS HAVING THEIR EDGES WELDED TOGETHER

[75] Inventors: George R. Claassen, New Kensington; Raymond J. Mickelic, Springdale, both of Pa.

[73] Assignee: PPG Industries, Inc., Pittsburgh, Pa.

[21] Appl. No.: 860,925

[22] Filed: Dec. 15, 1977

[51] Int. Cl.$^2$ .............................................. B66C 1/48
[52] U.S. Cl. ...................................... 294/118; 294/119
[58] Field of Search ............... 294/118, 115, 106, 28, 294/DIG. 1, 16, 119; 65/272, 374 M

[56] References Cited
U.S. PATENT DOCUMENTS

| | | | |
|---|---|---|---|
| 1,931,700 | 10/1933 | Murphy et al. | 294/118 |
| 2,981,563 | 4/1961 | McKelvey et al. | 294/119 |
| 3,477,840 | 11/1969 | Oelke et al. | 65/374 M |
| 3,624,876 | 12/1971 | Ervin | 294/119 |

Primary Examiner—James B. Marbert
Attorney, Agent, or Firm—Donald Carl Lepiane

[57] ABSTRACT

Tongs suspended from an overhead conveyor have porous metal surface engaging pads for vertically supporing a pair of glass sheets having their edges welded together and transporting the welded sheets from a welding station through an annealing lehr. Thereafter, the welded glass sheets are filled with gas and sealed to form a glass-edge multiple glazed unit.

15 Claims, 5 Drawing Figures

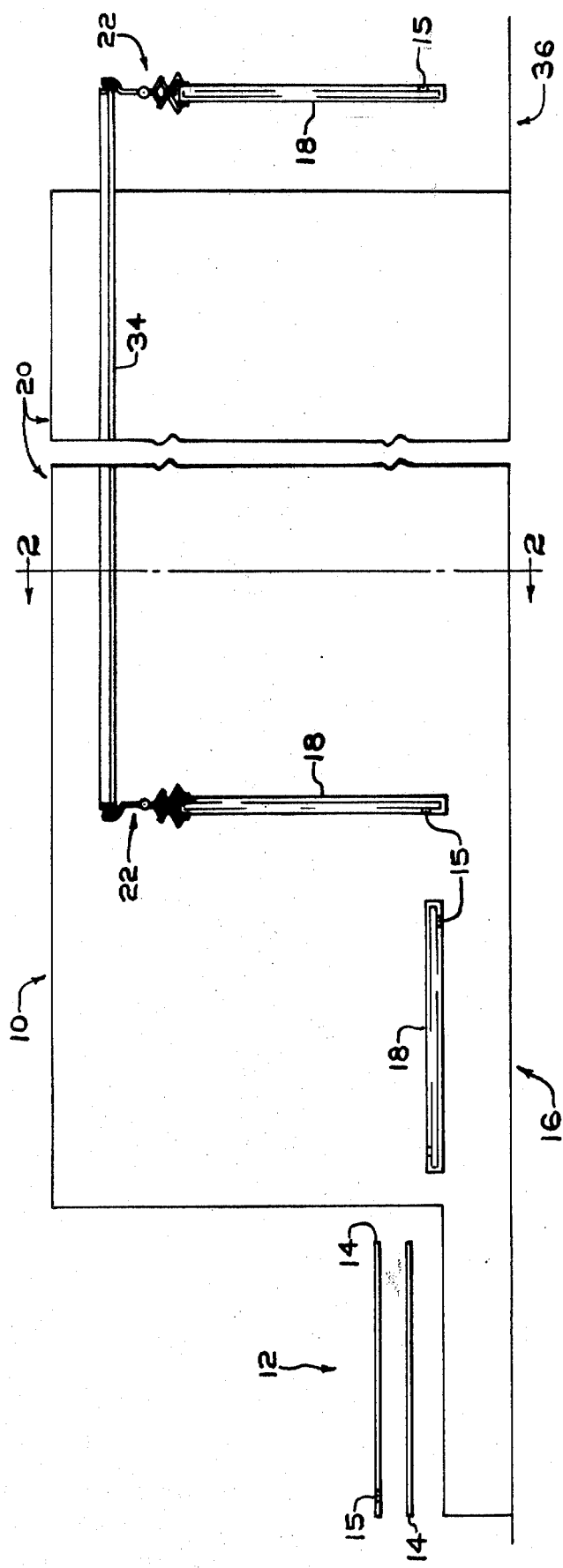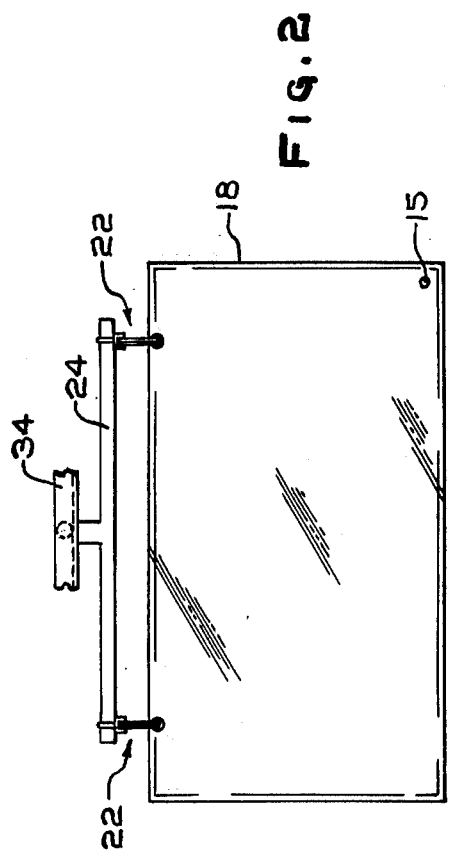

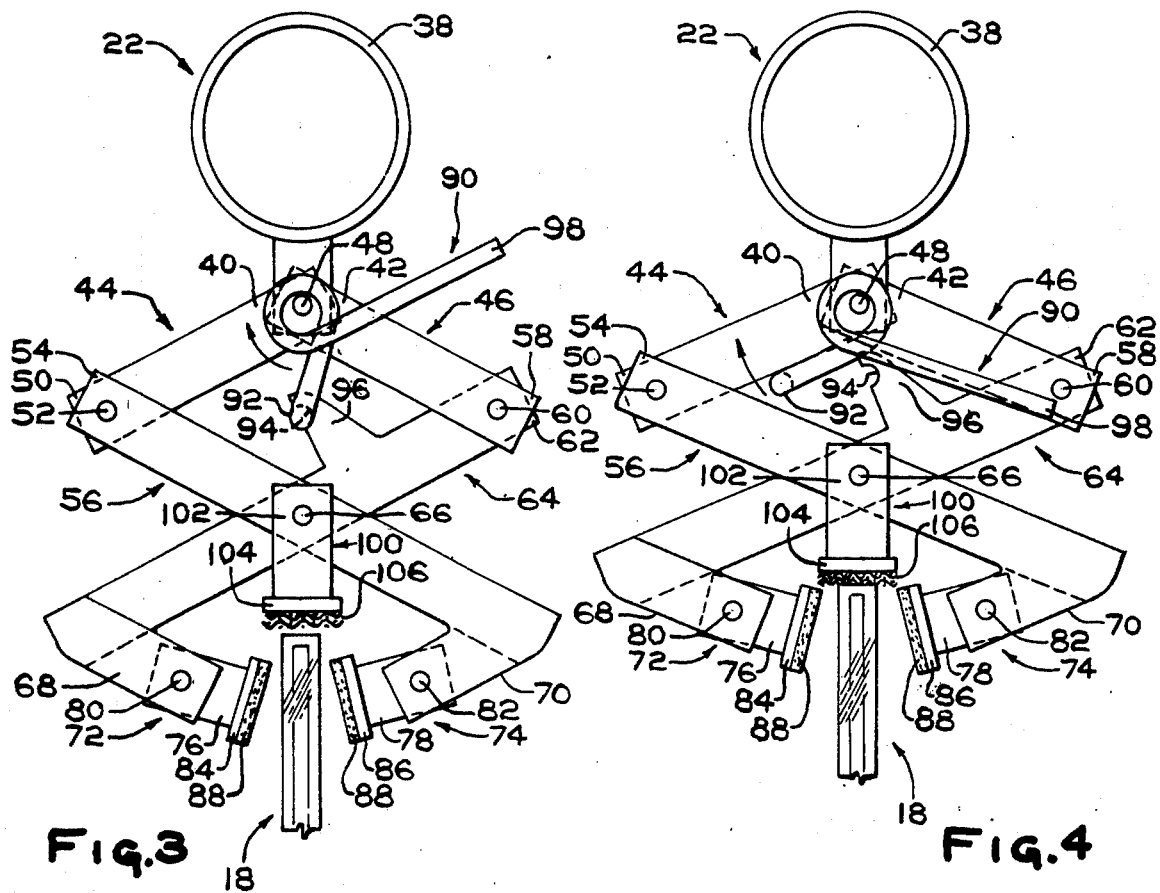
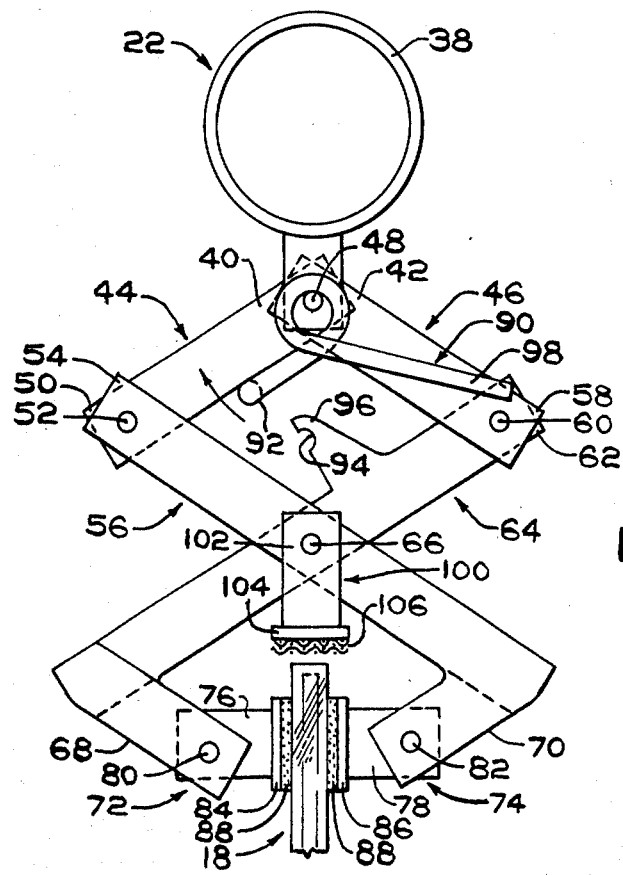

TONG FOR SUPPORTING GLASS SHEETS HAVING THEIR EDGES WELDED TOGETHER

BACKGROUND OF THE INVENTION

1. Field of the Invention

This invention relates to a tong and, more particularly, to a tong having metal surface engaging pads.

2. Discussion of the Technical Problems and Prior Art

As is known in the glass-edge multiple glazed manufacturing art, a pair of glass sheets having their edges welded together at a glass welding station are transported through an annealing lehr to prevent thermal damage to the welded sheets. Thereafter, the space between the welded sheets is filled with a gas and sealed to provide a glass-edge multiple glazed unit. In the art, it is common practice to vertically support the welded sheets by way of tongs when transporting the welded sheets through the annealing lehr.

In general, the prior art tongs are made of pivotally mounted metal arms having asbestos surface engaging pads. The asbestos pads minimize heat loss from the unit to the metal parts of the tongs and are capable of withstanding temperatures of about 1000° F. (540° C.) of the recently welded glass sheets. Asbestos pads, however, have drawbacks. More particularly, the asbestos pads when exposed to continual temperature cycles, i.e., room temperature at the exit end of the annealing lehr to about 1000° F. (540° C.) at the welding station environment, break down to a powder. Further, as the welded glass sheets are moved between the asbestos pads, the edge of the welded sheets contacts same causing the pads to flake. As is well known, asbestos powder or flakes create a potential health hazard.

In the prior art, for example, in U.S. Pat. Nos. 166,599; 1,428,679; 3,025,638; 3,089,727; 3,363,930; 3,390,911; 3,391,958; 3,392,006; 3,456,985; 3,830,540 and 3,913,966, there are taught tongs having metal; wood; rubber; plastic and/or refractory surface engaging pads. Although these prior art tongs eliminate the drawback of asbestos pads, they are not acceptable for use in transporting welded glass sheets from a welding station through an annealing lehr. As was mentioned, the temperature of recently welded glass sheets is approximately 1000° F. (540° C.); and therefore, surface engaging pads made of wood and rubber are not acceptable because they cannot withstand the high temperatures. The solid metal surface engaging pads are not acceptable because they can create thermal shock, i.e., rapid extraction of heat from the welded sheets through the metal pads. When this occurs, the welded sheets can fracture. The use of refractory pads is not acceptable because they are hard; and at temperatures of 1000° F. (540° C.), the glass is plastic and can be marred by the refractory pads.

It would be advantageous therefore to provide a tong having surface engaging pads that do not have the limitations of the prior art.

SUMMARY OF THE INVENTION

This invention relates to a tong for supporting a sheet, for example, glass sheets having their edges welded together. The tongs may be used in the manufacture of multiple glazed units for transporting welded sheets from a welding station through an annealing lehr. The tongs are of the type having a pair of engaging members moveable toward one another for engaging the sheet and away from each to release or receive the sheet. In the practice of the invention, the engaging members include a porous metal pad.

This invention further relates to an improved method of heating glass wherein the glass is held by contact with a tong. The tong grips the glass by applying pressure to its surface. The heated glass in one embodiment of the invention may be a pair of glass sheets having their edges welded at a welding station. The improvement includes the step of engaging the welded sheet by at least one tong having porous metal surface engaging pads.

BRIEF DESCRIPTION OF THE DRAWING

FIG. 1 is a side view of an apparatus for welding glass sheets using the tongs of the instant invention for transporting the welded sheets from a welding station through an annealing lehr;

FIG. 2 is a view taken along lines 2—2 of FIG. 1;

FIG. 3 is a frontal view of a tong of the instant invention in the non-engaging position for receiving welded glass sheets;

FIG. 4 is a view similar to the view of FIG. 3 illustrating the tong in an intermediate position, i.e., between the non-engaging position and the engaging position; and FIG. 5 is a view similar to the view of FIG. 3 showing the tong in the load position.

DESCRIPTION OF THE INVENTION

With reference to FIG. 1, there is shown an apparatus 10 for welding edges of glass sheets together. In general, the apparatus 10 includes a preparation station 12 where glass sheets 14 are cleaned in any conventional manner and a conductive stripe (not shown) is applied to marginal edge portions of a glass sheet. At the station 12, a hole 15 may be drilled in one of the sheets 14 to provide access to the space between the glass sheets to fill same with a gas. The glass sheets 14 are thereafter positioned at a welding station 16 where edge portions of the sheets are welded together in any conventional manner, for example, as taught in U.S. Pat. No. 3,847,584 which teachings are hereby incorporated by reference. The welded glass sheets 18 are vertically supported and transported through an annealing lehr 20 by tongs 22 incorporating features of the invention mounted on a T-bar 24 as shown in FIG. 2. The T-bar 24 is mounted on an overhead conveyor 34 in any conventional manner. The welded glass sheets 18 are removed from the tongs 22 at an unload station 36 for further processing. For example, the space between the glass sheets 18 is filled with a gas and the hole 15 sealed, e.g., as taught in U.S. Pat. Nos. 3,683,974 and 3,735,553 which teachings are hereby incorporated by reference.

As will be apparent, the invention is not limited to the use of the tongs of the instant invention in the manufacture of multiple glazed units; and is presented to illustrate the environment in which the tongs of the instant invention may be used.

With reference to FIGS. 3-5, the tongs 22 each include a member 38 for mounting the tongs 22 on the T-bar 24 (shown in FIG. 2). Each end 40 and 42 of short arms 44 and 46, respectively, are pivotally mounted to the member 38 at 48. The opposite end 50 of the short arm 44 is pivotally mounted at 52 to end 54 of long arm 56 as is the opposite end 58 of the short arm 46 pivotally mounted at 60 to end 62 of long arm 64. The long arms 56 and 64 are pivotally mounted at 66 to move ends 68 and 70 of the long arms 56 and 60, respectively, toward and away from each other. In this manner, engaging members 72 and 74 mounted on the end 68 and 70 of the long arms 56 and 64, respectively, are moved from a nonengaging position as shown in FIG. 3 to receive the welded glass sheets 18 to an engaging position as shown in FIG. 5 to engage the welded glass sheets 18.

The engaging members 72 and 74 each include a member 76 and 78, respectively, pivotally mounted in any conventional manner at 80 and 82 to end 68 and 70 of the long arms 64 and 56, respectively. A plate 84 and 86 is mounted at one side to the member 76 and 78, respectively, and has a metal porous pad 88 incorporating features of the invention mounted on the opposite side for engaging the welded glass sheets 18. As used herein the term "porous" is defined as a continuous network of passageways.

The engaging members 72 and 74 are maintained in the nonengaging position as shown in FIG. 3 by latch member 90 which is pivotally mounted at 48. Bar 92 of the latch member 90 is captured in groove 94 (shown better in FIGS. 4 and 5) of extension 96 mounted on one of the long arms 56 or 64 (shown in FIGS. 3-5 as mounted on the long arm 64). The latch member 90 is biased in a clockwise direction as viewed in FIGS. 3-5 by the weight of arm 98.

The bar 92 of the latch member 90 is maintained in the groove 94 of the extension 96 by weight of the arms 44, 46, 56 and 64; engaging members 72 and 74 and bumper 100 pivotally mounted at 66. As the glass welded sheet 18 is moved upward as viewed in FIGS. 3-5 by an elevator mechanism (not shown), it engages and moves the bumper 100 upward. The spaced distance between pivotal points 48 and 58 decrease thereby causing the latch member 90 and extension 96 to disengage. The latch member 90 is now free to move in a clockwise direction as viewed in FIGS. 3-5 under the weight of the arm 98. As the welded glass sheet 18 is moved downward as viewed in FIGS. 3-5 by the elevator mechanism (not shown), the engaging members 72 and 74 move toward one another to engage the welded glass sheet 18 as shown in FIG. 5.

The bumper 100 includes a member 102 pivotally mounted at 66 at one end and a plate 104 mounted on the other end. A pad 106 of porous material similar to the pad 88 of the engaging members 72 and 74 or of a wire mesh screen is mounted on the other surface of the plate 104 engaged by the welded glass sheets 18.

In the prior art, the pad 106 of the bumper 100 and pad 88 of the engaging members 72 and 74 are made of asbestos which is capable of withstanding the temperature required to weld the glass sheets 14, e.g., 1000° F. (540° C.) and acts as a heat insulator to prevent thermal shock to the welded glass sheets 18. However, the prior art asbestos pads are not acceptable for the following reasons. The asbestos pads continually cycled between about 1000° F. (540° C.), the temperature of the engaged welded glass sheets 18 and room temperature, the temperature at which the welded sheets are removed from the tongs. Continuous temperature cycling of the asbestos pads causes the pads to disintegrate into a powder. Further, the asbestos pads show considerable wear when welded glass sheets 18 are moved between the engaging members 72 and 74. More particularly, since the spaced distance between the engaging members is not always aligned with the welded glass sheets, the sheets brush against the asbestos pads. When this occurs, the asbestos pads flake. As is well known, asbestos powder or flakes in the environment may cause health problems. Another problem of the asbestos pad is the fact that they are not easily mounted on the plate members 84 and 86 of the engaging members 72 and 74, respectively. The teachnique which is normally employed is to mount rivets through the asbestos pads to secure them to their respective plate or in the alternative to use wire to secure them to their respective plate. As the asbestos wears or breaks down, the rivets and/or wire are exposed and contacts the welded glass sheets 18. Since the glass sheets 18 are at about 1000° F. (540° C.), they are a plastic and easily deformable or marred by the rivets and/or wire.

Practicing the instant invention eliminates all the drawbacks of the prior art. The present invention is directed to using porous metal pads made of pressed metal wires or strands in place of the asbestos pads. The pressed metal pads are ideally suitable for use with tongs used in the manufacture of multiple glazed units. More particularly, (1) the porous metal pads have pockets of air therein which act as a thermal insulator to prevent thermal shock to the welded glass sheets; (2) the porous metal pads provide a friction surface, i.e., peaks and valleys, which aid in securing the welded sheets in the tongs; (3) the pads are resistant to wear, yet resilient enough not to mar the welded glass sheets should they brush against the pads as it is moved toward the bumper 100; (4) the pads can resist the continual cycling between room temperature and about 1000° F. (540° C.) without deterioration; and (5) the pads do not mar the surface of the welded glass sheets.

The invention is not limited to the diameter of the pressed wire nor the pressure under which the pads are formed. However, it is recommended that the metal strands be selected such that the pressing thereof provides air pockets which act as thermal insulators. Pads that may be used in the practice of the invention are made of pressed sintered wire strands such as the type sold under the trademark FELT METAL sold by Technetics Company of Milford, Conn., Catalog No. FM-1310 and/or woven pressed metal strands such as the type sold under the trademark METEX METAL PADS sold by Metex Corporation of Edison, N.J., No. 11253A and 11253B.

The dimensions of the pads are not critical to the invention; however, the pads 88 should have a thickness sufficient to minimize heat transfer from the welded sheets to their respective plates 84 and 86 and to provide an acceptable engaging surface. Pads having a thickness of about ¼ inch (0.64 centimeter), a width of about 2 inches (5.08 centimeters) and a length of about 1 inch (2.54 centimeters) have been found to be acceptable in the practice of the invention for welded glass sheets having a surface area less than about 24 square feet (2.16 square meters). For welded sheets greater than about 24 square feet (2.16 square meters), the surface area and the thickness of the pad should be increased.

The number of tongs used for supporting the welded sheets as they move through the annealing lehr are not limiting to the invention. Normally for welded glass sheets having a surface area of less than about 24 square feet (2.16 square meters), two tongs spaced about 1 foot (0.3 meters) apart are used. For larger welded glass sheets, three or more tongs may be used.

Although the invention was discussed in combination with the manufacture of multiple glazed units, it can now be appreciated that the invention is not limited thereto. For example, the invention may be practiced for moving sheets through a tempering operation or in the alternative for transporting sheet material at room temperature. Further, the tongs may be used to transport sheets made of plastic, wood or glass.

DETAILED DESCRIPTION OF THE INVENTION

The tongs of the instant invention are used for transporting welded glass sheets from a welding station through an annealing lehr to an unload station where the welded glass sheets are further processed to make multiple glazed units.

With reference to FIG. 1, a plurality of tongs 22 are mounted on a T-bar 24 and spaced about 1 foot (0.3 meters) apart. A plurality of T-bars 24 mounted on an overhead conveyor 34 are spaced about 1 foot (0.3 meters) apart.

With reference to FIGS. 3–5, the tongs 22 include a metal support member 38 for mounting the tongs on the T-bar 24. End 40 and 42 of short arms 44 and 46, respectively, are pivotally mounted at 48 on the member 38. The short arms 40 and 42 each have a length of about 1½ inches (6.25 centimeters), a width of about ½ inch (1.27 centimeters) and a thickness of about ⅛ inch (0.32 centimeter). A long arm 56 has its end 54 pivotally mounted at 52 to end 50 of the short arm 44 and long arm 64 has its end 62 pivotally mounted at 60 to end 58 of the short arm 46. The long arms 56 and 64 are similar in construction and have a generally L-shaped configuration with the long leg having a length of about 4½ (11.4 centimeters), a width of about 178 inch (1.27 centimeters), and a thickness of about ⅛ (0.32 centimeter). The short leg has a length of about 1½ inches (3.81 centimeters), a width of about ½ inch (1.27 centimeters) and a thickness of about ⅛ inch (0.32 centimeter). The long arms 64 and 56 are pivotally mounted together at their midpoint 66. Engaging members 72 and 74 are pivotally mounted at 80 to the short leg of the long arms 56 and 64, respectively. The engaging members 72 and 74 each have a porous metal pad 88 having a length of about 2 inches (5.08 centimeters), a width of about 1 inch (2.54 centimeters) and a thickness of about ¼ inch (0.66 centimeter). The metal pads are of the type sold by Technetics Company of Milford, Conn., Catalog No. FM-1310 under the trademark FELT METAL.

A bumper 100 has a member 102 pivotally mounted at 66. The member has a width of about ½ inch (1.27 centimeters), a length of about 1 inch (2.54 centimeters) and a thickness of about ⅛ inch (0.32 centimeter). A plate 104 mounted on the member 102 has a width of about ¾ inch (1.92 centimeters), a length of about 2 inches (5.08 centimeters), and a thickness of about ⅛ inch (0.32 centimeter). A stainless steel wire mesh screen 106 is mounted on the plate 104 of the bumper 100 as shown in FIGS. 3–5.

A latch member 90 having a generally script E-shaped configuration is pivotally mounted at 48 and has a leg 92 for engaging latch member 96 mounted on the long arm 64. The latch member 90, extension 96 and engaging member 72 and 74 are sized such that the pads 88 are spaced about 1 inch (2.54 centimeters) apart when the tong 22 is in the engaging position as shown in FIG. 1.

With reference to FIG. 1, a pair of glass sheets 14 each about 6 feet (1.8 meters) by about 4 feet (1.2 meters) are prepared at 12 for welding at 16 in any conventional manner. At the welding station 16, the sheets 14 have the edges welded together as taught in U.S. Pat. No. 3,847,584. After the sheets are welded together, they are rotated to a vertical position in any conventional manner and moved between the pads 88 of a pair of adjacent tongs toward the bumper 100 as shown in FIG. 3.

With reference to FIGS. 3–5, as the welded sheets 18 move between the pads 88, the edge of the glass sheets engage the bumper 100 urging it upward as shown in FIG. 3. As shown in FIG. 4, continual movement of the bumper 100 upward decreases the spaced distance between the pivot pins 48 and 66 which causes the latch member 92 to disengage the extension 96. The latch member 92 pivots in a clockwise direction as viewed in FIG. 4 out of engagement with the extension 96 by the weight of the leg 98 of the latch member. The welded sheets are thereafter moved downwardly as the spaced distance between the pads 88 decreases by the weight of the tongs. As shown in FIG. 5, the pads 88 engage the welded sheets.

The welded sheets 18 supported by the tongs are moved through the annealing lehr 20 to the unload station 36 (see FIG. 1). At the unload station 36, the welded sheets are urged upwardly against the bumper pad to move the pads 88 away from one another. Thereafter, the arm 92 of the latch member 90 is moved in a counterclockwise direction as viewed in FIG. 3 to move the leg into engagement with the latch member 96 to maintain the pads in spaced relationship. The welded sheets are removed and further processed in any conventional manner to provide a glass-edge multiple glazed unit.

As can now be appreciated, the above example is presented for illustration purposes and is not limiting to the invention.

What is claimed is:

1. In a tong for supporting a heated sheet wherein the tong is of the type having a pair of sheet engaging members and means mounting said members for moving said members toward each other into a first position to engage the sheet and away from each other toward a second position to disengage the sheet, the improvement comprising:

the sheet engaging members comprising a metal pad made of pressed metal wires or strands having a continuous network of passageways having fluid therein to minimize thermal shock to the heated sheet when the sheet engaging members are in the first position.

2. The tong as set forth in claim 1 wherein said metal pad is made of pressed sintered metal wires or strands.

3. The tong as set forth in claim 1 further including:
a bumper mounted above the sheet engaging members, the bumper including a wire mesh screen; and
means for maintaining the sheet engaging members in spaced relation to one another.

4. The tong as set forth in claim 1, wherein the sheet is a pair of glass sheets fixed in spaced relationship to one another.

5. The tong as set forth in claim 1 wherein the fluid is air.

6. A tong used in combination with a glass welding furnace of the type having means for welding marginal edge portions of glass sheets together to form a subassembly; means for transporting the subassembly through an annealing lehr to an unload station wherein said transporting means include tongs of the type having a pair of sheet engaging members and means mounting said members for moving said members toward each other into a first position to engage the welded sheets and away from each other toward a second position to release the welded sheets, wherein the improvement comprises:

the sheet engaging members comprising a metal pad made of pressed metal wires or strands having a continuous network of passageways having a fluid therein to minimize thermal shock to the subassembly when the sheet engaging members are in the first position.

7. The tong as set forth in claim 6 further including a first arm having a first end and a second end; a second arm having a first end and a second end; a third arm having a first end and a second end; a fourth arm having a first end and a second end; means for pivotally mounting the first end of the first arm to the first end of the second arm; means for pivotally mounting the second end of the first arm to the first end of the third arm; means for pivotally mounting the second end of the second arm to the first end of the fourth arm means for pivotally mounting the third and fourth arms to one another intermediate of their ends; and means for pivotally mounting a sheet engaging member to the second end of the third and fourth arms.

8. The tong as set forth in claim 7 further including a bumper mounted at the pivot point of the third and fourth arms.

9. The tongs as set forth in claim 7 further including means for maintaining the sheet engaging members in spaced relationship to one another.

10. The tong as set forth in claim 8 wherein the bumper includes a porous metal pad.

11. The tong as set forth in claim 8 wherein the bumper includes a wire mesh screen.

12. The tong as set forth in claim 6 wherein said metal pads are made of pressed sintered metal wires or strands.

13. The tong as set forth in claim 6 wherein the fluid is air.

14. In a method of manufacturing a multiple glazed unit wherein the method includes the steps of welding the edges of pair of glass sheets together at a welding station; and transporting the welded sheets from the welding station through an annealing lehr wherein the improvement comprises the step of:

engaging the welded glass sheets with metal pads made of pressed metal wire or strands having a continuous network of passageways having fluid therein to minimize thermal shock to the heated sheet while praticing the step of transporting the welded sheets through the annealing lehr.

15. The method as set fort in claim 14 wherein the fluid is air.

* * * * *